United States Patent [19]

Hubble, III et al.

[11] Patent Number: 5,337,122
[45] Date of Patent: Aug. 9, 1994

[54] METHOD AND APPARATUS FOR MICR PRINTING QUALITY CONTROL

[75] Inventors: Fred F. Hubble, III, Rochester; Michael E. Weber, Penfield, both of N.Y.; Gerald Abowitz, Bradenton, Fla.; Raphael F. Bov, Jr., Pittsford, N.Y.; Michael G. Swales, Sodus, N.Y.; Paul W. Eakin, Webster, N.Y.

[73] Assignee: Xerox Corporation, Stamford, Conn.

[21] Appl. No.: 80,151

[22] Filed: Jun. 23, 1993

[51] Int. Cl.$^5$ .......................................... G03G 15/00
[52] U.S. Cl. ....................................... 355/208; 355/246; 346/160
[58] Field of Search ................ 355/202, 204, 208, 214, 355/246; 346/160; 235/449

[56] References Cited

U.S. PATENT DOCUMENTS

| | | |
|---|---|---|
| 4,114,032 | 9/1978 | Brosow et al. |
| 4,563,086 | 1/1986 | Knapp et al. |
| 4,584,529 | 4/1980 | Aoyama ................ 235/449 |
| 4,736,315 | 4/1988 | Ozaki et al. |
| 4,797,938 | 1/1989 | Will. |
| 4,891,240 | 1/1990 | Ward et al. |
| 4,901,114 | 2/1990 | Parker et al. |
| 4,922,086 | 5/1990 | Milford ................ 235/449 |
| 4,980,726 | 12/1990 | Aoki. |
| 4,984,281 | 1/1991 | Matsuhashi et al. |
| 5,030,977 | 7/1991 | Hanson et al. ................ 346/160 |
| 5,083,157 | 1/1992 | Smith et al. |
| 5,083,159 | 1/1992 | Corona et al. |
| 5,091,961 | 2/1992 | Baus, Jr. |
| 5,134,663 | 7/1992 | Kozlowski. |
| 5,151,952 | 9/1992 | Canu et al. |
| 5,162,874 | 11/1992 | Butler. |

*Primary Examiner*—Joan H. Pendegrass
*Attorney, Agent, or Firm*—Oliff & Berridge

[57] ABSTRACT

A magnetic ink monitoring system is provided including a reader which outputs an electrical signal representative of a magnetic flux, a storage mechanism which stores an integral representation of a signal from a standard magnetic ink display, and a comparator operatively connected to the read means and the storage means to compare an integral signal of the electrical signal of the magnetic ink display to the integral representation of a signal from a standard magnetic ink character.

28 Claims, 8 Drawing Sheets

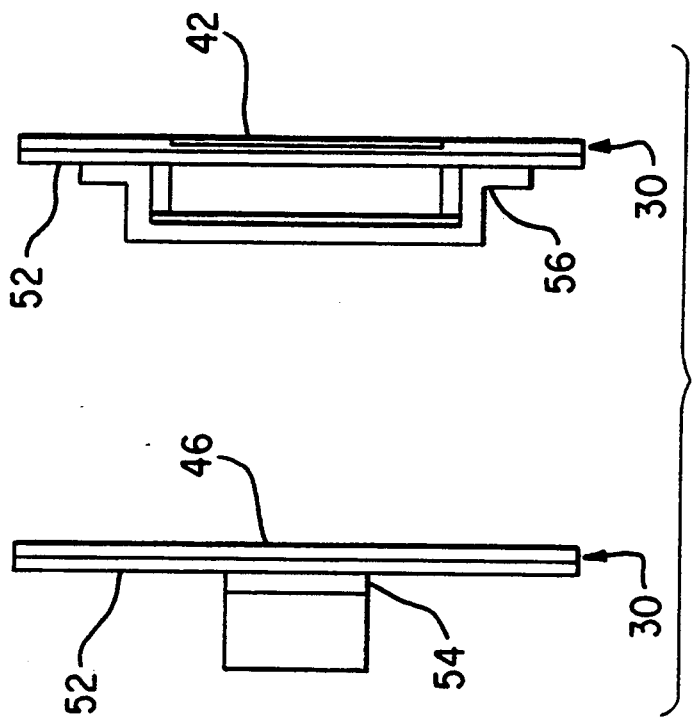
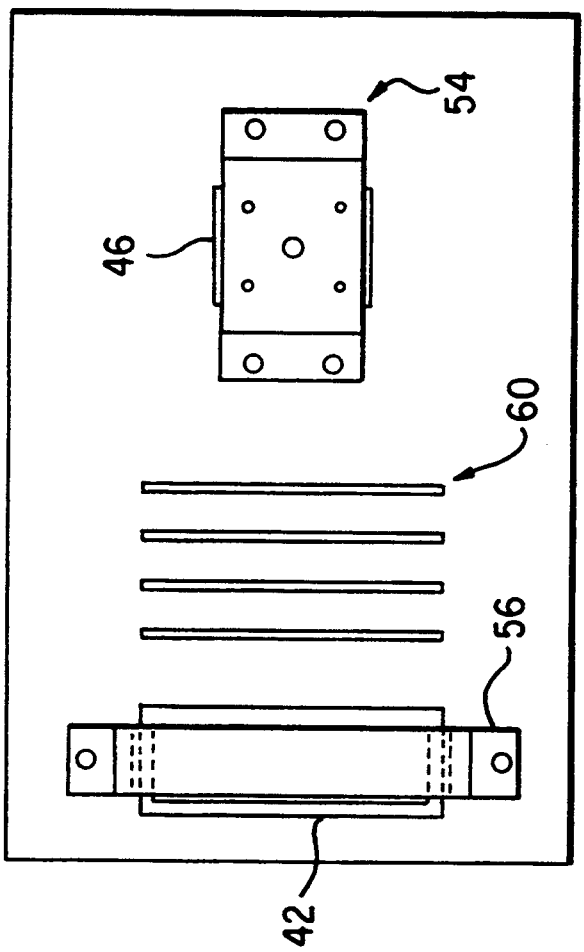
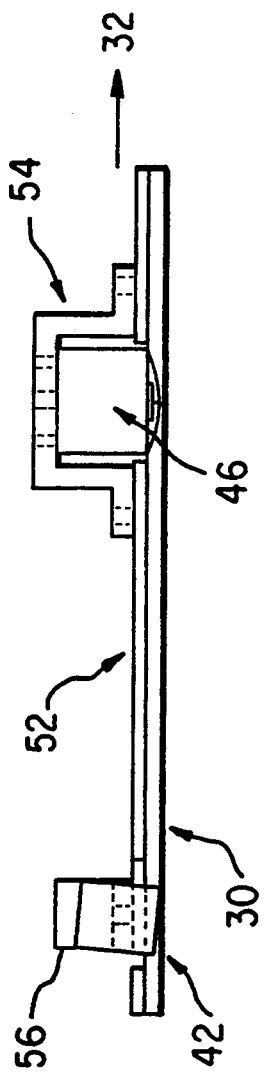
FIG. 4
FIG. 2
FIG. 3

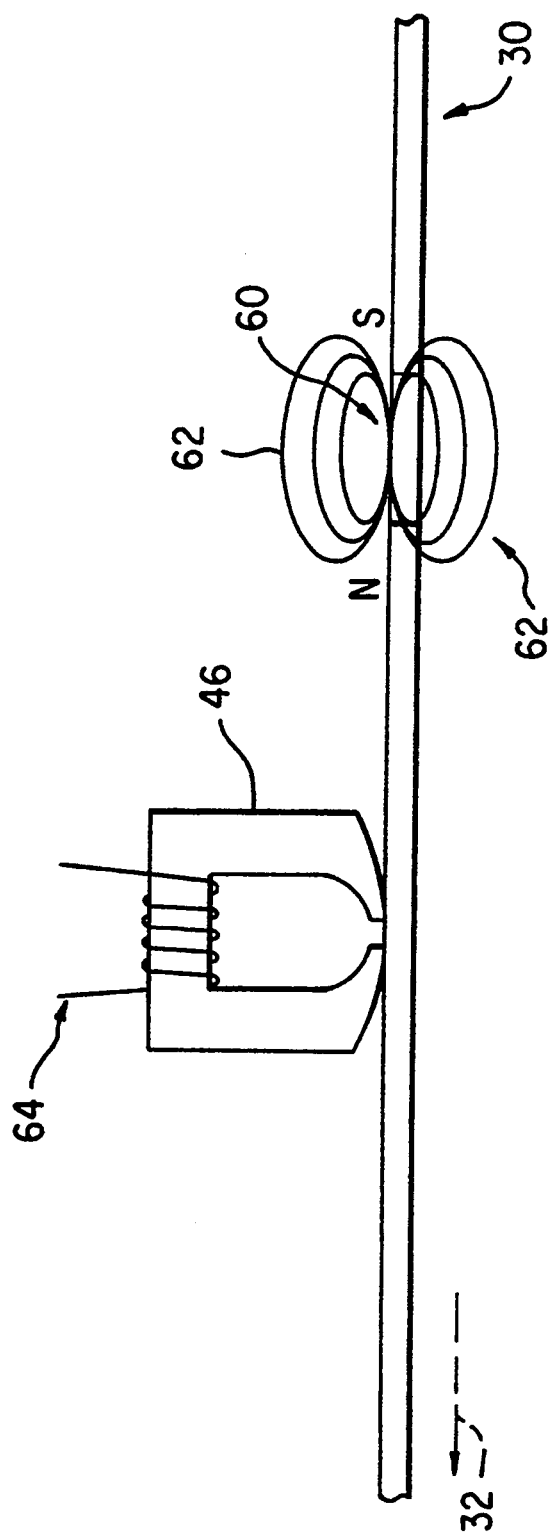

METHOD AND APPARATUS FOR MICR PRINTING QUALITY CONTROL

BACKGROUND OF THE INVENTION

The present invention relates to a magnetic ink character recognition system provided in an electrostatographic printer and to a method for controlling characters produced by magnetic ink character printing. Preferably, the invention relates to controlling the application of magnetic ink characters by electrostatographic printing and to a magnetic ink character recognition system.

The process of electrophotographic printing may include sensitizing the surface of an photoconductive member by charging to a substantially uniform potential. The charged portion of the photoconductive surface is exposed to a light image of an original document being reproduced. The light image selectively discharges portions of the surface thereby recording the image of the document. Alternatively, a modulated light beam, i.e., a laser beam, may be utilized to discharge the photoconductive surface to record the desired information. In this way, an electrophotographic latent image is recorded on the photoconductive surface. The image corresponds to the information desired to be reproduced. After the image is recorded on the photoconductive member, it may be developed by contact with developer material. The developer material may comprise toner particles adhering triboelectrically to carrier granules, or alternatively a single component development system may be employed. Both the carrier granules and toner particles may be magnetic, the toner particles having ferromagnetic parities encapsulated in a thermoplastic resin binder. The toner particles are transferred from the carrier granules to the latent image to form a toner powder image on the photoconductive member which is subsequently transferred to a copy sheet. The copy sheet is heated to permanently affix the powder image.

Electrostatographic printing is useful for producing checks or financial documents with magnetic characters for the banking industry and for other businesses producing financial instruments. The process involves fusing magnetic toner particles on the checks or documents to provide encoding in a magnetic ink character recognition (MICR) format. High speed processing of financial documents is simplified by imprinting magnetic ink characters and/or bar codes in a machine readable form. The magnetic character codes permit repeated processing of financial documents and their high speed sorting. Encoded information may be imprinted on financial documents with magnetic ink or toner. The resulting document copies may be subsequently read by an MICR reader and processed.

Ozaki et al., U.S. Pat. No. 4,736,315, disclose an apparatus for evaluating density and evenness of printed patterns including a circuit for calculating density distribution of imaged data, a circuit for normalizing density distribution with an area of affective image data and a circuit for quantifying the density and evenness of patterns.

Will, U.S. Pat. No. 4,797,938, discloses a process of identifying MICR characters comprising generating an analog signal representative of the characters, digitizing and storing values representing the analog signals, locating positive and negative peaks of the analog signals, testing the peaks against a first plurality of repeating patterns to determine which of the patterns fit the peak stored for the character, using a pattern which best fits the peaks to select the stored digitized values and testing the stored digitized values against the second plurality of patterns representing a set of characters which can be identified in order to identify the read character.

Word et al., U.S. Pat. No. 4,891,240, disclose printing MICR characters wherein the area in which the characters are to be printed is prelubricated.

Parker et al., U.S. Pat. No. 4,901,114, disclose an electronic printer employing tri-level xerography to superimpose two images during a single pass in a printer. One part of the composite image is formed using MICR toner, while the other part of the image is printed with less expensive black or color toner.

Aoki, U.S. Pat. No. 4,980,726, relates to a toner density control device for an electrophotographic copier with two sensing circuits, a toner density sensing circuit and an image density sensing circuit. Toner is supplemented whenever one of the two sensing circuits fails.

Matsuhashi et al., U.S. Pat. No. 4,984,281, relates to a magnetic ink character recognition system that includes a field unit for receiving digital signals from a storage unit and for sorting the digital signals from each field plus a decision unit for receiving the signals from the sort unit and for judging the thickness of ink characters and determining a representative thickness value for each character and a correction unit for correcting the digital signals from the storage unit based on decision data from the decision unit for each character and a recognition unit for determining whether or not the corrected signals are readable.

Smith et al., U.S. Pat. No. 5,083,157, relates to an electrophotographic printing machine wherein a nonmagnetic toner image is transferred to a copy substrate and MICR readable images are formed out of the previously fused non-magnetic image. A film is utilized and includes a heat resistant backing member and, a magnetic media adhered to the backing member. The film is used to press magnetic media against predetermined portions of nonmagnetic images. The film is heated to cause magnetic media to fuse to the selective non-magnetic image areas.

Corona et al., U.S. Pat. No. 5,083,159, discloses a method for providing initial optimized performance of an illumination and exposure system used to form a latent image at an exposure station of a document on a photosensitive medium, including the steps of introducing a linear photosensitive display consisting of a plurality of photodiodes to an exposure station, energizing an illuminator to produce a light output which is transmitted through the exposure station and is incident along the length of the array, converting the output of the photosensitive array into video signals representative of the average illumination output of the illuminator, providing a bar graph on a display screen of the average illumination error superimposed against a horizontal specification line on the display representing a maximum acceptable illumination level, and positioning the illuminator while observing the bar graph and selecting the alignment position at the lamp at which the bar graph is at a minimum value relative to the specification line.

Baus, U.S. Pat. No. 5,091,961, discloses a check reader which is operative with a variable check movement rate. The bank reader imposes a set of flux reversals over the magnetic ink characters to be read. The flux reversals permit a pulse count sequence to be generated which is unique to each magnetic ink character independent of the rate of check movement.

Kozlowski, U.S. Pat. No. 5,134,663, relates to a system and method for recognizing MICR characters including establishing a center line between first and last peaks of a scanned magnetic electrical readout, established in a location of major peaks, comparing the peak magnitudes and peak locations with parameters in a predetermined template. The magnitudes and locations are scored according to error deviation. The lowest scored template is then found to identify the character read.

Canu et al., U.S. Pat. No. 5,151,952, discloses an apparatus for detecting the position of edges in scanned characters and comparing them to the edges of selective characters and utilizing the ratio between the distances determined and using the ratio to compare to a stored set of standard ratios to identify the character scanned.

Butler, U.S. Pat. No. 5,162,874, discloses an electrophotographic apparatus having a densitometer. The apparatus includes means for generating diffused signal representative of the diffused component of light reflected from material placed on a substrate; means for generating a compensation ratio; means, responsive to the compensation ratio, for generating a compensated specular; and means responsive to the diffused signal for determining density of the material; and a means responsive to the compensated spectral signal for calibrating the determining means.

Application of magnetic ink to a copy sheet is a delicate process. The objective is to have a correct amount of magnetic ink deposited on a continuous basis. Too much magnetic ink causes smearing and too little will not provide a readable signal. In either instance, the magnetic ink characters are not accurately recognized.

It is desirable to provide a system for monitoring printed magnetic ink characters to assure that a correct amount of ink is deposited on a continuous basis. In a system, the printed magnetic characters may be read and compared to standard printed magnetic characters. The electrophotographic printer may be adjusted to resolve variations between the characters that are being read and the standard characters.

However, it is difficult to provide an accurate monitoring system because of a number of "noise" sources, including variations in the orientation of paper (alignment of reader head with respect to image). Paper may skew as much as 5% and greater from the longitudinal axis of the paper path. Other noise sources affecting the monitoring include the speed of image transport across the head gap and calibration of output to a reference standard.

Knapp et al., U.S. Pat. No. 4,563,086, discloses an electrophotographic printing machine in which a magnetic toner image is transferred to a copy sheet. The image is magnetized and the intensity of the magnetic field generated by the toner image is detected to provide a continuous indication of the quality of image fused on the copy sheet. The magnetic field intensity is proportional to the ratio of the mass of toner particles to the area of toner particles on the copy sheet. The machine further includes means for comparing the intensity of the magnetic field detected by the detecting means. In response, a control signal is generated that regulates a processing station of the printing machine.

The present invention relates to a method and system for controlling the application of magnetic ink characters to a substrate. The method comprises generating an electrical signal representative of a test magnetic ink character display, comparing the integral representation with the integral representation of a predetermined magnetic ink display, and adjusting the application of magnetic ink characters to a substrate according to the comparing step. The generating step may comprise applying a test magnetic ink character display to a substrate, reading the magnetic ink character display as the substrate passes a read element, and generating the electrical signal representative of the display. The application of a magnetic ink character display to a substrate in, for example, an electrostatographic printing process, may be adjusted in response to the comparing step.

One embodiment of the invention comprises applying the predetermined magnetic ink character display to a substrate, reading the predetermined magnetic ink character display as the substrate passes a read element, generating an electrical signal representative of the predetermined magnetic ink character display, and converting the electrical signal of the predetermined magnetic ink character display to the integral representation.

The test magnetic ink character display and the predetermined magnetic ink character display may be applied side by side on a substrate. Each display may comprise a plurality of imaged lines. Each of the plurality of imaged lines of the test magnetic ink character display may be imaged alternately among each of the plurality of imaged lines of the predetermined magnetic ink character display with each of the plurality of test image lines adjacent one of each of the plurality of the standard imaged lines.

An electrical signal from each of the plurality of imaged lines of the predetermined magnetic ink character display may be compared to a reference integral representation. The comparing step may comprise separately adding the test and reference integral representations and comparing the sum of the test integral representations with the sum of the reference integral representations. The application of magnetic ink characters is adjusted according to the difference between the sums. The displays may alternate side by side and the signals are divided into test signals and into reference signals depending upon the order received.

Each of the integral representations from the test display may be compared to the integral representation from an adjacent reference display to give a compared value. The compared values may be added and the application of magnetic ink characters adjusted according to the sum of the compared values.

Further, the invention relates to a magnetic ink character recognition system, ,comprising a reader for detecting magnetic flux generated from a magnetic character and outputting an electrical signal representative of the magnetic flux and a comparator operatively connected to the reader for comparing an integral signal of the electrical signal of the magnetic character to the integral representation of a signal from the standard magnetic ink character. The system may be a self-contained magnetic ink character recognition device and may comprise a generator responsive to the comparator for generating a control signal to regulate a processing station of an electrostatographic printer. Or the system may be part of an electrostatographic printing system.

BRIEF DESCRIPTION OF THE DRAWINGS

FIG. 2 is a schematic diagram of the components of the MICR quality control sensor layout of the present invention as a top view.

FIG. 3 is a schematic diagram showing the MICR quality control sensor layout as a side view.

FIG. 4 is a schematic diagram showing components of the MICR quality control sensor in end views.

FIG. 5 is a schematic representation of the details of the MICR quality control sensor detector.

DESCRIPTION OF PREFERRED EMBODIMENTS

Figure 1:
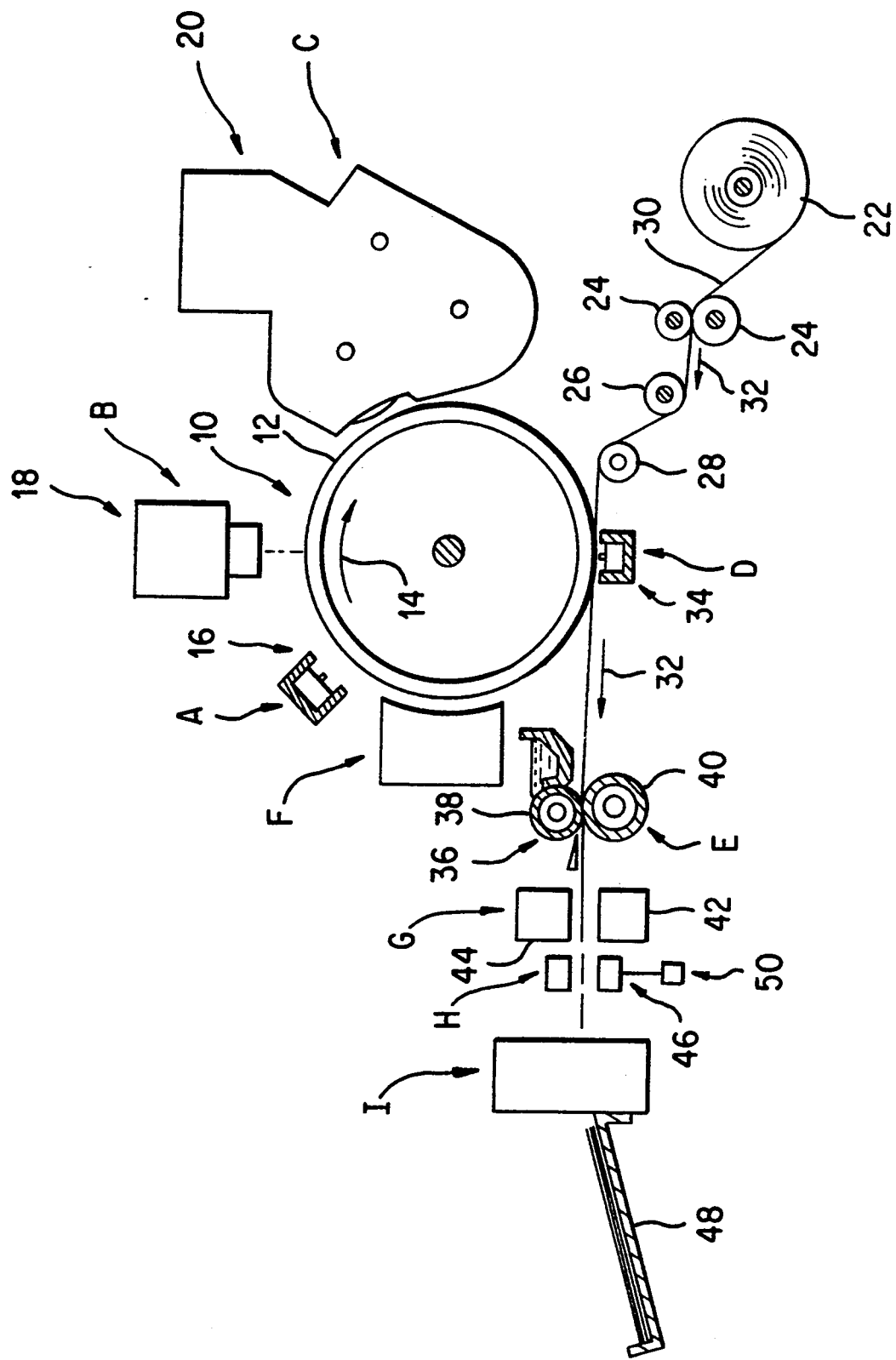
FIG. 1 is a schematic elevational view showing an illustrative electrostatographic printing machine incorporating the features of the present invention.

The present invention relates to a method and system for controlling the application of magnetic ink characters to a substrate. FIG. 1 schematically depicts the various components of an illustrative electrophotographic printing machine incorporating the method and system of the present invention therein. It will become evident from the following discussion that the method and system are equally well suited for use in a wide variety of applications.

Inasmuch as the art of electrophotographic printing is well known, the various processing stations employed in the FIG. 1 printing machine will be shown schematically and their operation described briefly.

As shown in FIG. 1, the illustrative electrophotographic printing machine employs a drum 10 having a photoconductive surface 12 adhering to a conductive substrate. Preferably, the photoconductive surface 12 comprise a selenium alloy with the conductive substrate being an electrically grounded aluminum alloy. Drum 10 rotates in the direction of arrow 14 to advance successive portions of photoconductive surface 12 sequentially through various processing stations disposed about the path of movement.

Initially, a portion of photoconductive surface 12 passes through charging station A. At charging station A, a corona generating device, indicated generally by the reference numeral 16, charges photoconductive surface 12 to a relatively high, substantially uniform potential. Corona generating device 16 has a charging electrode and a conductive shield positioned adjacent photoconductive surface 12. A change in output of a power supply (not shown) causes corona generating device 16 to vary the charge voltage applied to photoconductive surface 12.

The charged portion of photoconductive surface 12 is advanced through imaging station B. Imaging station B includes an exposure system, indicated generally by the reference numeral 18. In exposure system 18, an original document is positioned face down upon a transparent platen. Light rays reflected from the original document are transmitted through a lens to form a light image. The light image is focused onto the charged portion of photoconductive surface 12 to selectively dissipate charge. This records an electrostatic latent image on photoconductive surface 12 which corresponds to the informational areas contained within the original document. An optical system of the foregoing type need not be the only system employed to selectively dissipate charge on the photoconductive surface. For example, a modulated light beam, such as a laser beam, may be used to illuminate the charged portion of the photoconductive surface to selectively dissipate charge. After the electrostatic latent image is recorded on the photoconductive surface, drum 10 advances the latent image to development station C.

At development station C, a development system, indicated generally by the reference numeral 20, transports a developer material of carrier granules having triboelectrically adhering toner particles. The developer material is brought into contact with the electrostatic latent image. The toner particles are magnetic and are preferably made from a ferromagnetic material, such as magnetite embedded in a resin binder. The latent image electrically attracts toner particles to form a powder image on photoconductive surface 12 of drum 10. Development system 20 employs a developer roller which is electrically biased to a potential between background potential and image potential as recorded on photoconductive surface 12. As successive electrostatic latent images are developed, toner particles are depleted from the developer mixture. A toner particle dispenser is positioned in development system 20 to furnish additional toner particles to the developer mixture for subsequent use thereby.

Exposure system 18 may be arranged to record a sample electrostatic latent image on photoconductive surface 12 in an interdocument area. This sample electrostatic latent image is developed with magnetic toner particles at development station C.

After development, drum 10 advances the toner image to transfer station D. At transfer station D, a web of support material may be moved into contact with the powder image. The web of support material 30 is advanced from a roll 22 by feed rolls 24 and tensioning rollers 26 and 28. As support material 30 advances, in the direction of arrow 32, it passes through transfer station D. Transfer station D includes a corona generating device 34 which sprays ions onto the backside of web 30. The ions attract magnetic toner powder image from photoconductive surface 12 to web 30. After transfer, web 30 continues to move in the direction of arrow 32 to fusing station E.

Fusing station E includes a fuser assembly, indicated generally by the reference numeral 36, which permanently affixes the transferred toner image to web 30. Fuser assembly 36 may include a heater fuser roller 38 and a back-up roller 40. Web 30 passes between fuser roller 38 and back-up roller 40. The powder image on web 30 contacts fuser roller 38 to permanently affix the image to web 30. Additionally, the sample toner image transferred to web 30 in the interdocument region is permanently affixed or fused.

After the powder image is transferred from photoconductive surface 12 to web 30, drum 10 rotates the photoconductive surface to cleaning station F. At cleaning station F, a magnetic brush cleaning system removes the residual particles adhering to photoconductive surface 12. The magnetic brush cleaning system transports carrier granules closely adjacent to the photoconductive surface to attract residual toner particles.

After fusing, web 30 continues to move in the direction of arrow 32 to advance the fused toner image through magnetizing station G. Magnetizing station G may include a pair of magnetizing heads 42 and 44 disposed on opposed sides of web 30. Magnetizing heads 42 and 44 are substantially identical and each head includes a core around which is wound a coil connected by leads to a source of magnetizing current. As web 30 advances the magnetic toner image and magnetic toner sample through magnetizing station G, the toner particles become magnetized as described in detail with reference to FIGS. 2–5.

Web 30 advances in the direction of arrow 32 through MICR control sensor station H. Control sensor station H includes a magnetic read head which is a magnetic transducer, indicated generally by the reference numeral 46. The read head 46 may be a single gap magnetic read or other magnetic transducer known to those skilled in the art. Read head 46 is energized by the magnetic field generated from the toner powder image fused to web 30. The output from read head 46 is transmitted to a logic network 50.

At cutting station I, the web 30 is cut into copy sheets. Each sheet advances to catch tray 48 for subsequent removal from the printing machine by an operator.

FIGS. 2–5 show the layout of MICR quality control sensor station H. The station includes magnetic read head 46 secured to paper transport baffle 52 by means of read head bracket 54. Magnetizing head 42 is secured to the baffle 52 by means of magnet bracket 56. FIG. 3 in particular shows read head 46 and magnetizing head 42 positioned over web 30. Web 30 is transported in direction 32 relative to paper transport baffle 52. Test pattern 60 is a magnetic toner image that includes toner particles which become magnetized by magnetizing head 42 to generate a magnetic field 62 shown in FIG. 5. If the magnetizing head applies a saturating field to the toner, then the intensity of the magnetic field 62 near the center of the line test pattern 60 is proportional to the toner mass per area on web 30, and to the width of the line. The magnetic field 62 is illustrated in FIG. 5. The magnetic read head 46 is positioned above and in contact with the media with its read gap aligned inboard, outboard, which is perpendicular to the direction of motion of the web 30. The magnetic field 62, moving past the head 46, generates a signal in read head coil 64. The generated signal provides a measurement of the width of the magnetic material in test pattern 60. The amplitude of the generated signal is proportional to toner mass and hence to the signal strength of the magnetic test pattern 60. The generated signal thus is proportional to MICR signal strength as determined in commercial MICR readers.

Read head 46 transmits the generated signal to the logic circuit 50. The logic circuit 50 compares the magnetically derived signal from read head 46 with a reference to generate a control signal. The logic circuit is illustrated by the flow chart of FIG. 6 (hereinafter described in detail). The control signal is proportional to the difference between the desired toner mass per area on web 30 and the measured toner mass per area of copy. Thus, the control signal, is an error signal. This error signal is also a measure of the quality of the toner image fused to web 30. Hence, logic circuit 50 provides a continuous monitoring of the quality of the toner image fused to web 30. The error signal may be utilized to regulate various processing stations within the printing machine. The error signal from logic circuit 50 may be used to control charging, exposing, development, transfer, and dispensing of toner particles into the developer mixture.

Figure 7:
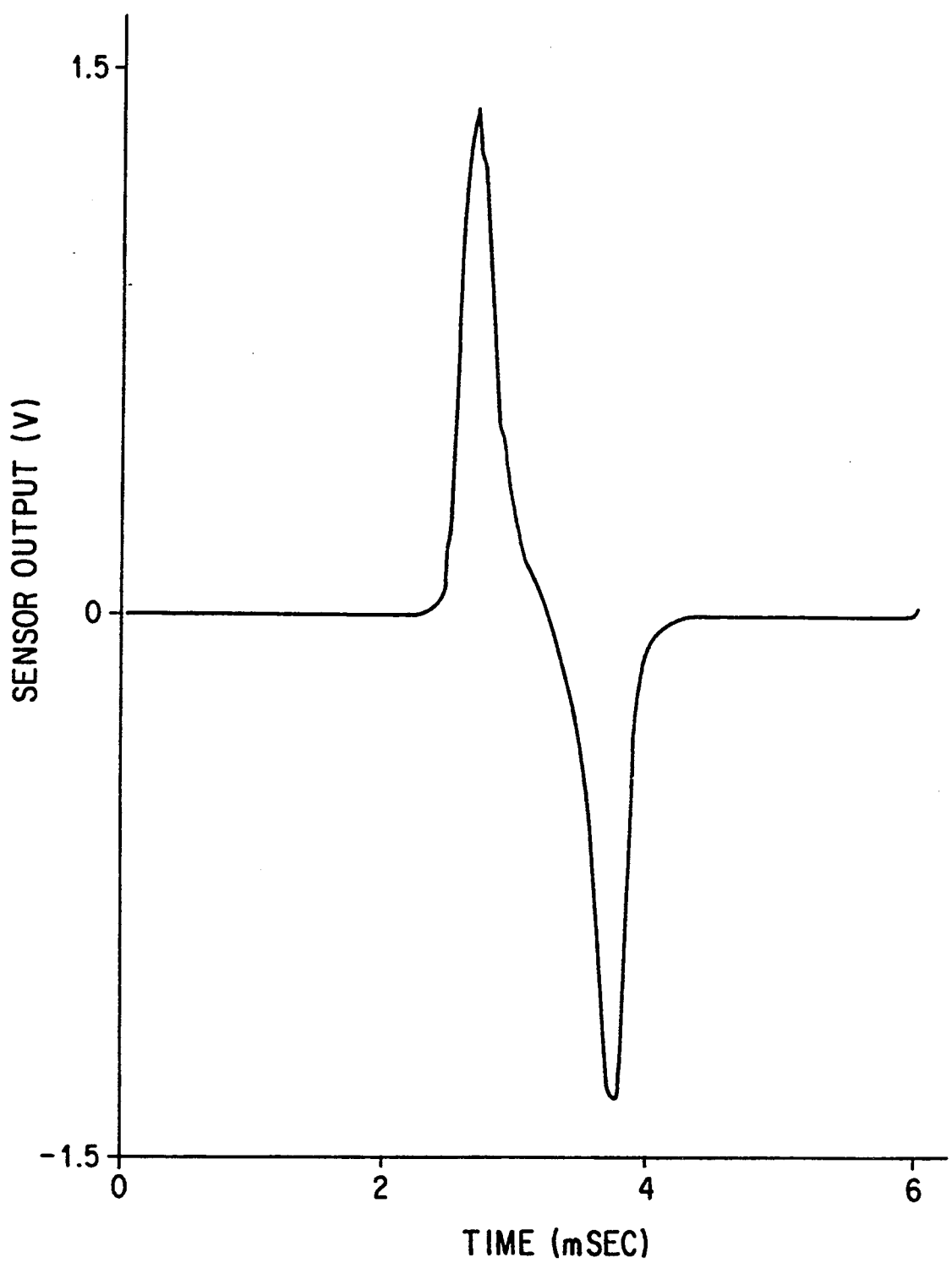
FIG. 7 is a graph of a typical test pattern signal.

The generated signal is obtained from the head preamplifier. The signal is integrated to reduce sensitivity to noise in the signal, alignment between the head and the magnetic material, and the speed at which the material is passed by the head. FIG. 7 is a view of the signal from a single line as illustrated by sensor output in volts plotted against time. The magnetic flux of a signal from a single line has both a north pole and a south pole. As the line approaches the reader head 46, the reader senses a first magnetic flux from the first pole. FIG. 7 shows an electrical signal from the read head proportional to the intrusion of magnetic flux per unit time and illustrates that initially the rate of flux buildup rapidly increases to a peak, then subsides to zero with a quick change in flux at the center of the line as the opposite pole of the line approaches the reader. The quick change in rate of flux buildup is illustrated as a negative voltage plotted against time. After reaching maximum negative voltage, the decreasing magnetic flux of the south pole of the line causes the reader to sense a rate of flux change that returns to the zero reference line.

Figure 8:
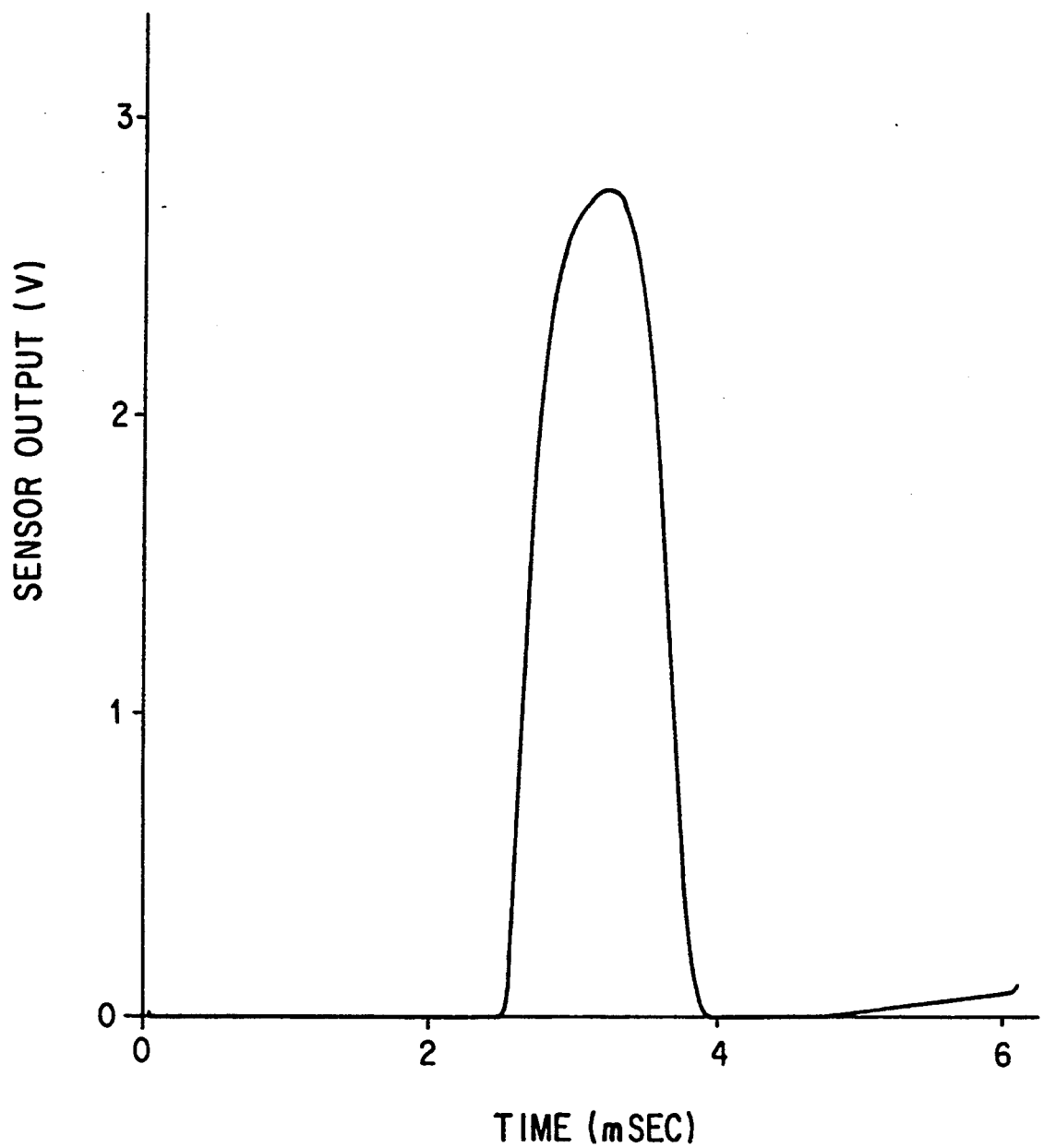
FIG. 8 is a graph of the integral of the test pattern signal of FIG. 7.

FIG. 8 illustrates the integral of the plot of sensor output in volts against time illustrated in FIG. 7. The integral results in an "adding up" of the sensor output to provide a maximum of voltage output from the sensor as plotted against time. Since the integral illustrates adding up of the change in magnetic flux and results in flux illustrated as a maximum voltage output, the integral representation results in a voltage output substantially less sensitive to "noise".

In a comparative embodiment of the present invention, circuit design is simplified through use of a combination of a test image and a pre-printed reference image. With this embodiment, sensitivity to component variation and circuit drift is reduced. The test image, a plurality of lines, is imaged between a plurality of reference line images, such that the test and reference lines are presented to read head 46 alternately. As described, the head output (FIG. 7) is integrated (FIG. 8). The integration reduces head to image alignment sensitivity and eliminates sensitivity to speed fluctuation of the web.

Figure 6:
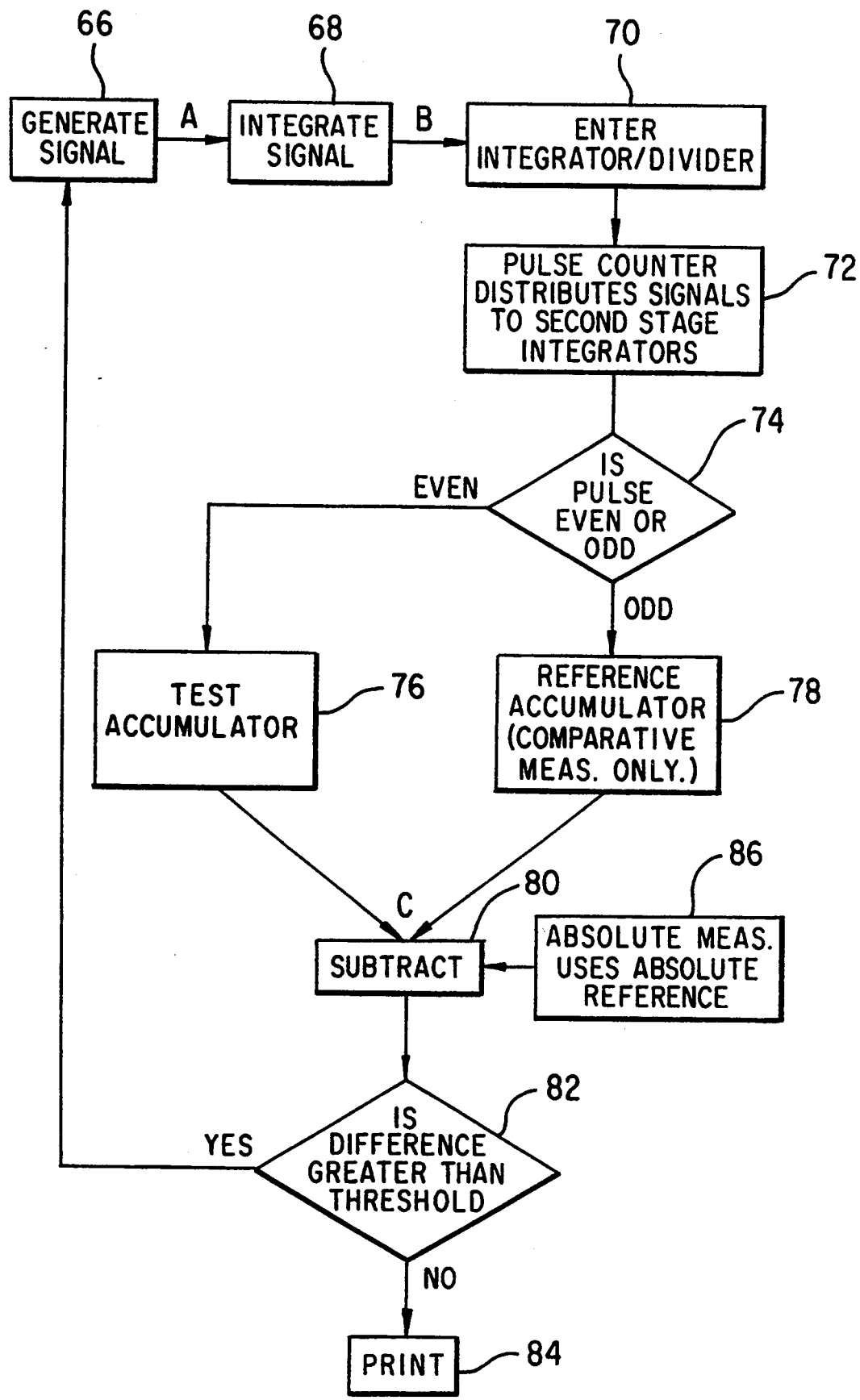
FIG. 6 is a flow chart of the method of controlling the application of magnetic ink characters.

Referring to FIG. 6, an electrical signal is generated 66 (both test and standard characters) from head coil 64 (FIG. 5). The integral of the signal is obtained 68, 70. Alternately sensed pulses are divided 72, 74 into test and reference pulses, based on the order in which they are received. The respective signals are summed 76, 78. The difference in total signal between the groups is calculated 80 and the resulting value is used 82 as the signal level quality control parameter. As shown in FIG. 6, if the difference is greater than a determined threshold value, the magnetic ink character will not be printed. In this instance another signal is generated 66 either in a retest or after the system is adjusted. The system may either be adjusted manually or automatically by direct control of the various processing stations within the electrophotographic printing machine as hereinafter described. If the difference is not greater than the determined threshold value, the magnetic ink character is printed 84.

In another embodiment as illustrated in FIG. 6, the signal 66 is generated solely from the test magnetic character. The test magnetic character signal is integrated 68 and is then compared 86 to an integrated absolute reference. After the comparison the difference is determined 82. If the difference is greater than the threshold, another signal is generated 66. If the signal is not greater than the threshold, then the magnetic character is printed 84.

Figure 9:
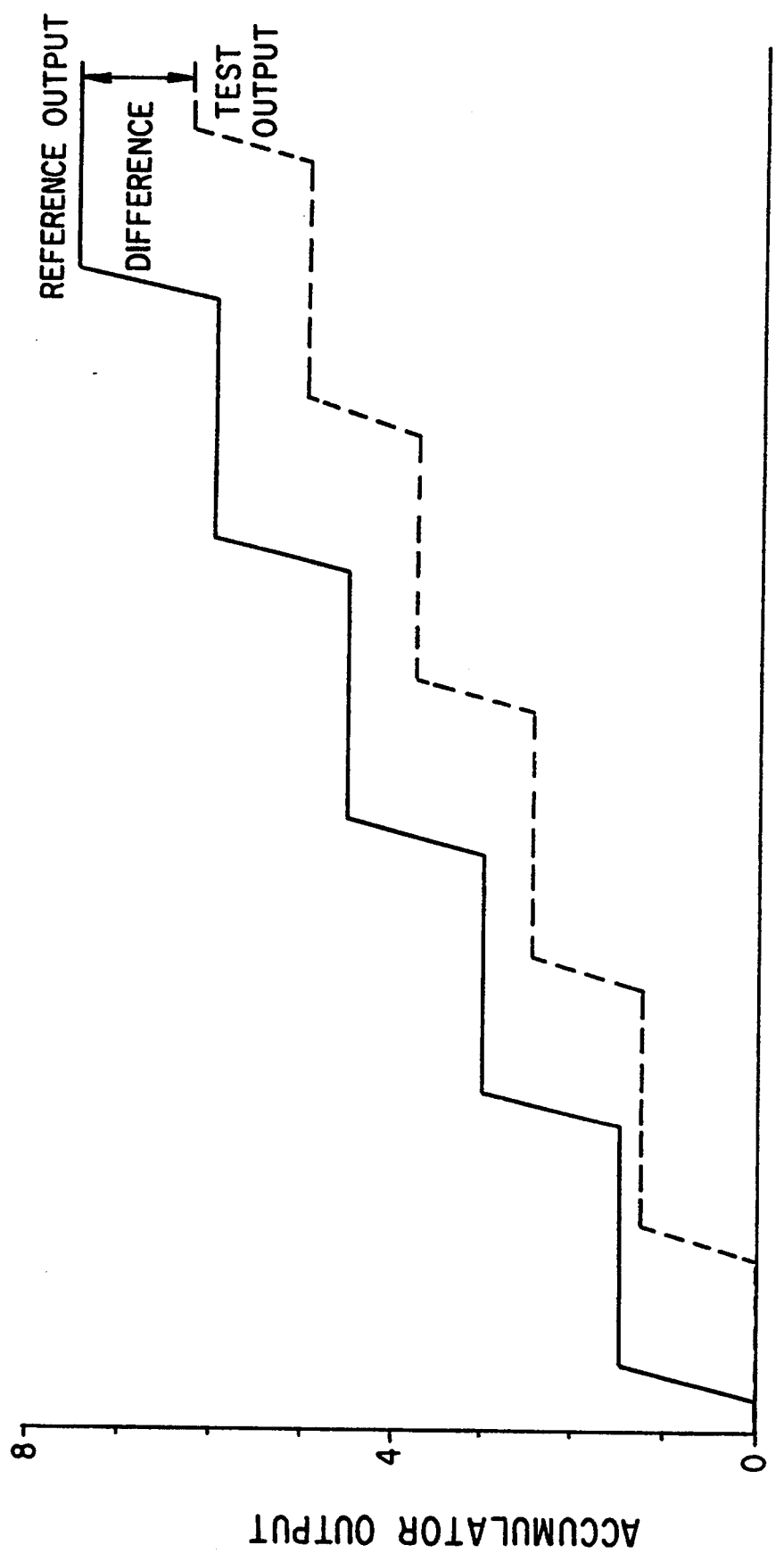
FIG. 9 is a graph of accumulator output versus time for a comparative measurement procedure.
Figure 10:
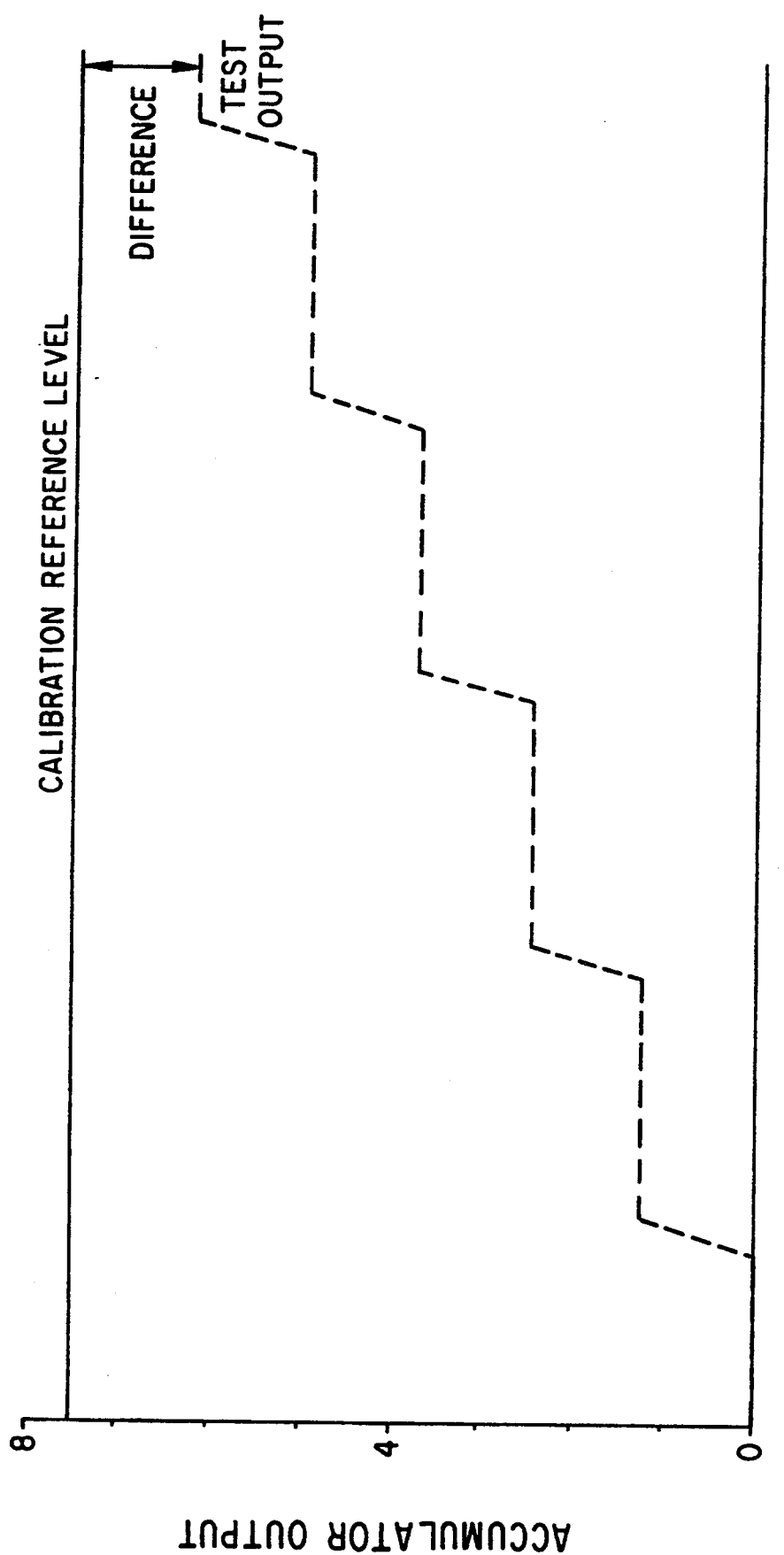
FIG. 10 is a graph of accumulator output versus time for a absolute measurement procedure.

FIGS. 9 and 10 illustrate the two measurement methods. In FIG. 9, the comparative measurement, the plot of accumulated output against time shows summation of separate discrete comparisons to provide the difference figure. In FIG. 10, the plot illustrates the accumulation of all signals from the scanned magnetic ink characters. The integrated total of signal voltage is compared to a calibrated absolute reference level. In either instance, the results are utilized to determine a no/go print.

The logic shown in FIG. 6 is illustrative of a self-contained magnetic character recognition device which may be a hand held swipe testing device. Further, the FIG. 6 is illustrative of the control logic of the present invention as part of an electrostatographic printing process.

In the present invention, head output integration reduces alignment and media speed sensitivity. Since maximum read head output (FIG. 7) is obtained when the head gap is parallel with the image line edge, slight deviations from parallel alignment cause amplitude of the head output wave form to fall. Integration of the head output (FIG. 8) provides a five to ten times reduction in alignment sensitivity.

Further, the comparative measurement system described above is improved in permitting simplification of circuit design. The comparative measurement removes the need to retain a calibration level within the controlling system either as part of an electrostatographic printing device or as part of a separate swipe testing device. The comparative measurement desensitizes the system to component variation during initial assembly and to drifts over time and with use. It allows a simple toggle switch to direct incoming signal pulses to a pair of accumulators. This simplification in design alleviates need for digital signal processing within the circuitry. The system permits a threshold accept/reject method or permits a continuous resetting of processing stations within a printing machine.

The present invention is not limited to the generation of signals for making a no/go printing decision with subsequent adjusting of the application of magnetic ink characters. The acquired signal and a control signal resulting from the logic circuit of FIG. 6, may be utilized to directly control various processing stations within an electrophotographic printing machine. For example, logic circuit 50 may transmit a control signal to a voltage source. A control signal from logic circuit 50 may be used to regulate the output voltage so as to control corona generator 16 to direct the generator 16 to produce a charge sufficient to maintain photoconductive surface 12 at a preselected potential. Additionally, logic circuit 50 may be in communication with scan lamps of exposure system 18 to effect change in lamp voltage in order to maintain photoconductive surface 12 discharge at a desired level. Logic circuit 50 for example, may also regulate the developer roller of development system 20 and/or the furnishing or depletion of toner particles in the development system. The system of the present invention may be utilized to control a variety of processing stations within an electrophotographic imaging machine as well as to monitor the quality of a magnetic ink image fused to a copy sheet.

EXAMPLE

In the following example, a high inductance commercially available MICR tape head was utilized with a relatively large gap and track width, 0.003 inches and 0.625 inches, respectively. The high inductance maximized the electrical signal per unit change in magnetic field strength with time. The relatively large head geometry provided a double benefit of maximizing the amount of flux being measured, which contributed to high electrical signal, and maximizing the number of magnetic particles in the nip, which reduced statistical signal variation. Additionally, the ratio of the gap to the width provided an averaging effect on the output signal.

Output of the magnetic head was lead to a preamp and amplifier both biased at one half $V_{cc}$ to allow recording both positive and negative flux changes. The output of the second amplifier was lead to an integrating circuit to record the integral of the head signal. Signal were recorded on a Norland 3001 digital oscilloscope and stored on disk for subsequent examination and printout.

The test pattern chosen for a series of tests consisted of five lines and four on-us symbols lithographically printed on generic 8½×11 copy paper to magnetic strengths ranging from 50% to 250% of normal. The lines were printed perpendicular to the direction of processing near the center of the document. The lines were nominally 0.0133 inches (13.3 mils) wide, which is close to the nominal width of the narrowest MICR character stroke, 0.0130 inches. The four on-us symbols were ranged in quadrature surrounding the lines. Additionally, an identical xerographic pattern generated at nominal print density was included in the test. Photomicrographs were made of the lines at 100× magnification. Voids and ragged edges were noted in the lithographic lines, and lead and trail edge toner disturbances were evidenced in the xerographic.

The documents were slit to approximately standard check size, mounted on a fixture, demagnetized, properly remagnetized, and scanned with a sensor at a typical printer process speed, 15"/second. The on-us characters were demagnetized and scanned with two commercial readers, a Micrmate and a Signameasure. Correlations were made between sensor line signals and commercial on-us signals.

Magnetization was performed using a permanent Neodymium Iron Boron magnet which applied 1.5 kilogauss to the ink to promote maximum remnant magnetization parallel to the direction of processing. Three formulations of ink were employed in the procedures—a nominal mixture, a highly doped formulation, and a lightly doped formulation. The resulting lines were measured optically with a Nikon Optiphot microscope equipped with a digital stage.

Tests conducted within these parameters showed that any of the lead edge peak, the trail edge peak or the maximum integrated signal of a test pattern composed of lines printed perpendicular to the process direction could be measured. The measurements had a high degree of correlation with the signal strength of on-us MICR characters printed at the same time and read by commercial readers. Further, the sensor has the ability to measure magnetic line width and this magnetic width was well correlated to the optical width. The example demonstrates the feasibility of an in-machine MICR signal strength measurement method.

While the invention has been described with reference to particular preferred embodiments, the invention is not limited to the specific examples given, and other embodiments and modifications can be made by those skilled in the art without departing from the spirit and scope of the invention and claims.

What is claimed is:

1. A method for controlling the application of magnetic ink characters to a substrate, comprising:
    generating an electrical signal representative of a magnetic ink character;
    comparing an integral representation of said electrical signal with an integral representation of a printed predetermined magnetic ink character; and
    adjusting the application of magnetic ink to a substrate according to said comparing step.

2. The method of claim 1, wherein said electrical signal represents the width of said magnetic ink character.

3. The method of claim 1, wherein said electrical signal represents the amplitude of said magnetic ink character.

4. The method of claim 1, wherein said electrical signal represents the width and amplitude of said magnetic ink character.

5. The method of claim 1, wherein said magnetic ink character comprises a magnetic test pattern.

6. The method of claim 1, wherein said magnetic ink character is an on-line product of a magnetic ink printing process.

7. The method of claim 1, wherein the application of magnetic ink character comprises an electrostatographic printing process.

8. The method of claim 7, comprising adjusting a corona generator in said electrostatographic printing process according to said comparing step.

9. The method of claim 7, comprising adjusting a photoconductive surface discharge in said electrostatographic printing process according to said comparing step.

10. The method of claim 7, comprising adjusting a developer system in said electrostatographic printing process according to said comparing step.

11. The method of claim 1, wherein said generating step comprises;
    applying a test magnetic ink character to a substrate;
    reading said magnetic ink character as the substrate passes a read element; and
    generating said electrical signal representative of said character.

12. The method of claim 11, comprising:
    applying a predetermined magnetic ink character to a substrate;
    reading said predetermined magnetic ink character as the substrate passes a read element;
    generating an electrical signal representative of said predetermined magnetic ink character;
    converting the electrical signal of said predetermined magnetic ink character to integral representation.

13. The method of claim 12, comprising applying said test magnetic ink character and said predetermined magnetic ink character side by side on a substrate.

14. The method of claim 13, wherein each said magnetic ink character comprises a plurality of imaged lines.

15. The method of claim 13, comprising converting an electrical signal from each of said plurality of imaged lines of said predetermined magnetic ink character to a reference integral representation.

16. The method of claim 15, wherein each of said integral representations from said test magnetic ink character is compared to a reference integral representation.

17. The method of claim 16, wherein said comparing step comprises separately adding said test and reference integral representations and comparing the sum of said test integral representations with the sum of said reference integral representations, and adjusting the application of magnetic ink characters according to the difference between said sums.

18. The method of claim 17, wherein said displays alternate side by side and said signals are divided into test signals and into reference signals depending upon the order received.

19. The method of claim 18, comprising and comparing each of said integral representations from said test magnetic character to the integral representation from an adjacent reference magnetic ink character to give a compared value, adding each compared value, and adjusting the application of magnetic ink characters according to the sum of compared values.

20. A magnetic ink character recognition system, comprising:
    a reader for detecting magnetic flux generated from a magnetic ink character and outputting an electrical signal representative of said magnetic flux;
    an integral comparator operatively connected to said reader for comparing an integral signal of said electrical signal of said magnetic ink character to an integral representation of a signal from a printed predetermined magnetic ink character;
    a generator responsive to said integral comparator for generating a control signal in response to the comparing of integral signals; and
    a regulator responsive to said control signal for regulating a processing station of an electrostatographic printer.

21. The magnetic ink character recognition system of claim 20, comprising a printer for printing said magnetic ink character.

22. The magnetic ink display recognition system of claim 20, comprising a magnet for magnetizing said magnetic ink character to generate said magnetic flux.

23. The magnetic ink character recognition system of claim 22, comprising a printer for printing said magnetic ink display.

24. The magnetic ink character recognition system of claim 23, comprising a magnet for magnetizing said magnetic ink display to generate said magnetic flux.

25. An electrostatographic printer comprising the magnetic ink character recognition system of claim 20.

26. A self-contained magnetic ink character recognition device, comprising the magnetic ink character recognition system of claim 20.

27. The magnetic ink character recognition system according to claim 20, comprising means for converting a signal from said printed predetermined magnetic ink character to an integral representation of said signal.

28. A method for controlling the application of magnetic ink characters to a substrate, comprising:
    applying a plurality of test magnetic ink characters and predetermined magnetic ink characters side by side to a substrate, one of each said magnetic ink characters adjacent one of each said predetermined magnetic ink characters;

reading said plurality of test magnetic ink characters and said predetermined magnetic ink characters as the substrate passes a read element;

generating electrical signals representative of said magnetic ink characters;

converting the electrical signals to integral representations;

comparing integral representations of said test magnetic ink characters with integral representations of said predetermined magnetic ink characters; and adjusting the application of magnetic ink to a substrate according to said comparing step.

* * * * *